United States Patent
Hays

(10) Patent No.: US 10,151,613 B2
(45) Date of Patent: Dec. 11, 2018

(54) VIBRATORY FLOW METER AND METHOD TO GENERATE DIGITAL FREQUENCY OUTPUTS

(71) Applicant: Micro Motion, Inc., Boulder, CO (US)

(72) Inventor: Paul J Hays, Lafayette, CO (US)

(73) Assignee: Micro Motion, Inc., Boulder, CO (US)

(*) Notice: Subject to any disclaimer, the term of this patent is extended or adjusted under 35 U.S.C. 154(b) by 46 days.

(21) Appl. No.: 15/317,201

(22) PCT Filed: Jul. 8, 2014

(86) PCT No.: PCT/US2014/045783
§ 371 (c)(1),
(2) Date: Dec. 8, 2016

(87) PCT Pub. No.: WO2016/007142
PCT Pub. Date: Jan. 14, 2016

(65) Prior Publication Data
US 2017/0102258 A1    Apr. 13, 2017

(51) Int. Cl.
*G01F 1/84* (2006.01)
*G01F 15/075* (2006.01)

(52) U.S. Cl.
CPC .......... *G01F 1/8436* (2013.01); *G01F 1/8431* (2013.01); *G01F 15/075* (2013.01)

(58) Field of Classification Search
CPC .................................................. G01F 1/8436
See application file for complete search history.

(56) References Cited

U.S. PATENT DOCUMENTS

| | | | | |
|---|---|---|---|---|
| 4,843,890 A | * | 7/1989 | Samson | G01F 1/8413 702/46 |
| 4,872,351 A | * | 10/1989 | Ruesch | G01F 1/74 73/861.04 |
| 4,876,879 A | * | 10/1989 | Ruesch | G01F 1/74 73/32 A |
| 4,879,911 A | * | 11/1989 | Zolock | G01F 1/8413 73/861.356 |
| 4,911,006 A | * | 3/1990 | Hargarten | B67D 7/08 702/183 |
| 4,934,196 A | * | 6/1990 | Romano | G01F 1/8431 702/45 |
| 4,996,871 A | * | 3/1991 | Romano | G01F 1/8431 73/32 A |

(Continued)

FOREIGN PATENT DOCUMENTS

| JP | 2001027554 A | | 1/2001 |
|---|---|---|---|
| JP | 2004093467 | * | 3/2004 |
| JP | 2004093467 A | | 3/2004 |

*Primary Examiner* — Manuel L Barbee
*Assistant Examiner* — Raymond Nimox
(74) *Attorney, Agent, or Firm* — The Ollila Law Group LLC

(57) ABSTRACT

A device and method to generate digital serial frequency outputs in a Coriolis flow meter is provided. The present invention provides the theoretically lowest jitter for a given input clock, the highest possible pulse count accuracy, the highest possible absolute accuracy, easily implementable other aspects (including Quadrature, pulse width, etc.) and requires no specialized external hardware, and is, therefore, implemented with commonly available serial output hardware found in most microcontrollers.

12 Claims, 4 Drawing Sheets

(56) References Cited

U.S. PATENT DOCUMENTS

| | | | | |
|---|---|---|---|---|
| 5,295,084 A * | 3/1994 | Arunachalam | ....... | G01F 1/8413 |
| | | | | 702/50 |
| 5,555,190 A * | 9/1996 | Derby | ................... | G01F 1/8431 |
| | | | | 702/106 |
| 6,408,700 B1 * | 6/2002 | Matt | ..................... | G01F 1/8409 |
| | | | | 73/861.355 |

* cited by examiner

VIBRATORY FLOW METER AND METHOD TO GENERATE DIGITAL FREQUENCY OUTPUTS

TECHNICAL FIELD

The present invention relates to a device and method for generating digital serial frequency outputs, and more particularly, to generating digital serial frequency outputs to show flow rate in a Coriolis flow meter.

STATEMENT OF THE PROBLEM

In past times, purely mechanical devices created frequency outputs from basic spinning wheels which activated a switch for each rotation. This type of output became established and is now widely required in various industrial applications.

A frequency output (FO) is a digital output from a device which produces a toggling of a single line to create a frequency. In the flow measurement industry, the frequency is typically in proportion to a desired variable, such as mass flow rate. Flow measurement techniques have been described in detail in Coriolis mass flow meters.

Coriolis mass flow meters measure mass flow and other information with respect to materials flowing through a pipeline as disclosed in U.S. Pat. No. 4,491,025 and Re. 31,450. These flow meters typically comprise a flow meter electronics portion and a flow meter sensor portion. Flow meter sensors have one or more flow tubes of a straight or curved configuration. Each flow tube configuration has a set of natural vibration modes, which may be of a simple bending, torsional, radial, or coupled type. Each flow tube is driven to oscillate at resonance in one of these natural vibration modes. The natural vibration modes of the vibrating, material filled systems are defined in part by the combined mass of the flow tubes and the material within the flow tubes. When there is no material flowing through a Coriolis flow meter sensor, all points along the flow tubes oscillate with a substantially identical phase. As material flows through the flow tubes, Coriolis accelerations cause points along the flow tubes to have a different phase. The phase on the inlet side of the flow meter sensor lags the driver, while the phase on the outlet side of the flow meter sensor leads the driver.

Coriolis flow meter sensors typically include two pick-offs for producing sinusoidal signals representative of the motion of the flow tubes at different points along the flow tubes. A phase difference of the sinusoidal signals received from the pick-offs is calculated by the flow meter electronics. The phase difference between the pick-off signals is proportional to the mass flow rate of the material flowing through the flow meter sensor. An example of a Coriolis flow meter is shown in FIG. 1.

The flow meter electronics receive the pick-off signals from the pick-offs. The flow meter electronics process the pick-off signals to compute a mass flow rate, a density, or another property of the material passing through the flow meter sensor.

Microcontrollers, which are implemented on an integrated circuit with many complex peripherals, are commonly used in all flow meters. Widely available microcontrollers are generic, and therefore low in cost, and are not specifically designed for flow meters. An example of a microcontroller is shown in FIG. 2.

For measuring instantaneous flow rate, low 'jitter' is important. Jitter is defined to be the accuracy of the period of any given pulse. For example, if odd-numbered pulses are 99.9 Hz and even-numbered pulses are 100.1 Hz, the average frequency would be 100 Hz but the output would be said to have 0.1/100 or 0.1% jitter.

For measuring total integrated flow, high accuracy (in terms of resolution) is important. For example, given the 1 pulse equals 1 gram example, if 998 pulses are created but 1000 grams were measured by the device, then the output would be said to have 998/1000 or 0.2% accuracy.

With regards to other aspects of frequency outputs, there is a class of dual frequency outputs (commonly called Quadrature) where one frequency outputs leads the other by 90 degree phase for positive flow, or lags by 90 degree phase for negative flow. Another aspect is non-50% duty cycle requirements. Frequency outputs must function over a wide range, typically between 0.001 Hz and 10000 Hz; although higher and lower frequencies are sometimes needed.

As mentioned above, one way to generate a frequency output is with "general purpose" digital hardware timer circuits, of which there are a variety of types, and are commonly available on microcontrollers. In this approach, a hardware timer (typically with divide-by-n and interrupt capability) is programmed to output a specific frequency for a certain amount of time. However, this approach has several disadvantages. Because the resultant frequency stems from a divide-by-n algorithm, significant jitter ensues even with high-frequency input clocks. For example, given an input clock of 10 MHz, and a desired output of 9999 Hz, the timer must be alternated between 10000 Hz (divide-by-1000) and 9990.01 Hz (divide-by-1001). Additionally, it is also challenging to create an algorithm that can keep accurate track of the number of pulses put out, because phase alignment of the output of the hardware timer does not coincide with the timer counter update times. A third disadvantage is that the general purpose timers are at most 32-bit; providing for approximately five decades of range, where eight decades are necessary. Accordingly, different input clocks and crossover thresholds must be introduced; and with this comes discontinuities, increased jitter under the threshold and added complexity in maintaining pulse accuracy. Finally, depending on the individual features of the "general purpose" timer, it can be very difficult to implement the "other aspects" of frequency outputs like Quadrature, pulse width, etc.

A less common way to generate a frequency output is through the use of a "rate multiplexer". This hardware is generally not available in microcontrollers, but can be built into an ASIC (Application Specific Integrated Circuit), FPGA (Field-Programmable Gate Array), or other custom circuitry. The rate multiplexer overcomes several of the disadvantages of the "general purpose" timer method including ease in spanning the needed range (so that no crossovers are introduced) and ease in maintaining pulse accuracy (as the phase alignment of the update time always matches the output). Further, because it's implemented with custom hardware, the "other aspects" of frequency outputs such as Quadrature and pulse width are easily achievable. Nevertheless, the rate multiplexer requires external hardware and is sub-optimal (and non-deterministic) at keeping low jitter.

In addition to the rate multiplexer, several other ways to create a frequency output can be conceived of and implemented on custom hardware (for example, ASIC, FPGA, etc.). However, all such options share the same basic disadvantage of the rate multiplexer scheme in that extra components, reduced reliability and increased cost would be present.

Lastly, a frequency output can be created using analog electronics. This was a common preference in the transition period between purely mechanical and digital electronic devices. An example analog circuit is a Voltage-Controlled Oscillator that converts a voltage into a frequency. Due to the analog nature, the conversion is not 100% accurate (e.g. 1V might be intended to be converted to 1000 Hz but may be 999.9 Hz or 1000.1 Hz due to analog component tolerances). In analog electronics, although the frequency output has near-zero jitter, the output also has poor pulse-count accuracy. Additionally, while a digital feedback can be integrated into the analog electronics to compensate for the pulse-count accuracy, this induces latency and reduces absolute frequency accuracy.

Therefore there is a need in the art for a microcontroller device and method to overcome the above-mentioned problems by providing a digital serial frequency output which: accounts for jitter in a given input clock, pulse count accuracy, absolute accuracy, has the capacity for implementing "other aspects" including quadrature and pulse width, and requires no specialized external hardware.

SUMMARY OF THE INVENTION

The present invention overcomes the problems outlined above and advances the art by providing a theoretically lowest jitter for a given input clock, the highest possible pulse count accuracy, the highest possible absolute accuracy, easily implementable "other aspects" (Quadrature, pulse width, etc.) and requires no specialized external hardware.

ASPECTS OF THE INVENTION

In one aspect of the invention, a method to generate a frequency output on a microcontroller comprising: initializing an input clock signal having a predetermined period; calculating a parameter based on the predetermined period; calculating a desired frequency based on the calculated parameter and a predetermined flow rate-frequency scaling; calculating a plurality of fractional pulses, wherein each fractional pulse of the plurality of fractional pulses is calculated based on the desired frequency, the predetermined period of the input clock signal, and a value of a preceding fractional pulse, and outputting the desired frequency by toggling an output state when the calculated fractional pulse is greater than or equal to half of an output pulse period.

Preferably, wherein if the preceding fractional pulse is an initial fractional pulse, the value of the preceding fractional pulse is set to zero.

Preferably, wherein the output pulse period is calculated based on the predetermined period of the input clock signal, the calculated parameter, and the predetermined flow rate-frequency scaling.

Preferably, wherein the meter electronics are configured to measure an instantaneous flow rate.

Preferably, wherein the meter electronics are configured to measure a total integrated flow based on the number of toggled output states and the predetermined flow rate-frequency scaling.

Preferably, wherein the parameter includes a flow rate.

In one aspect of the invention, a vibratory flow meter (5) comprising: a flow meter assembly (10) including one or more flow tubes (103A, 103B) and first and second pickoff sensors (105, 105'); a driver (104) configured to vibrate the one or more flow tubes (103A, 103B); and meter electronics (20) coupled to the first and second pickoff sensors (105, 105') and coupled to the driver (104), with the meter electronics (20) generating a frequency output by being configured to: initialize an input clock signal having a predetermined period; calculate a parameter based on the predetermined period; calculate a desired frequency based on the calculated parameter and a predetermined flow rate-frequency scaling; calculate a plurality of fractional pulses, wherein each fractional pulse of the plurality of fractional pulses is calculated based on the desired frequency, the predetermined period of the input clock signal, and a value of a preceding fractional pulse, and output the desired frequency by toggling the output state when the calculated fractional pulse is greater than or equal to half of an output pulse period.

Preferably, wherein if the preceding fractional pulse is an initial fractional pulse, the value of the preceding fractional pulse is set to zero.

Preferably, wherein the output pulse period is calculated based on the predetermined period of the input clock signal, the calculated parameter, and the predetermined flow rate-frequency scaling.

Preferably, wherein the meter electronics are configured to measure an instantaneous flow rate.

Preferably, wherein the meter electronics are configured to measure a total integrated flow based on the number of toggled output states and the predetermined flow rate-frequency scaling.

Preferably, wherein the parameter includes a flow rate.

DESCRIPTION OF THE DRAWINGS

The same reference number represents the same element on all drawings. The drawings are not necessarily to scale.

DETAILED DESCRIPTION OF THE INVENTION

FIGS. 1-4 and the following description depict specific examples of flow meter electronics to teach those skilled in the art how to make and use the best mode of the invention. For the purpose of teaching inventive principles, some conventional aspects of the flow meter electronics have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
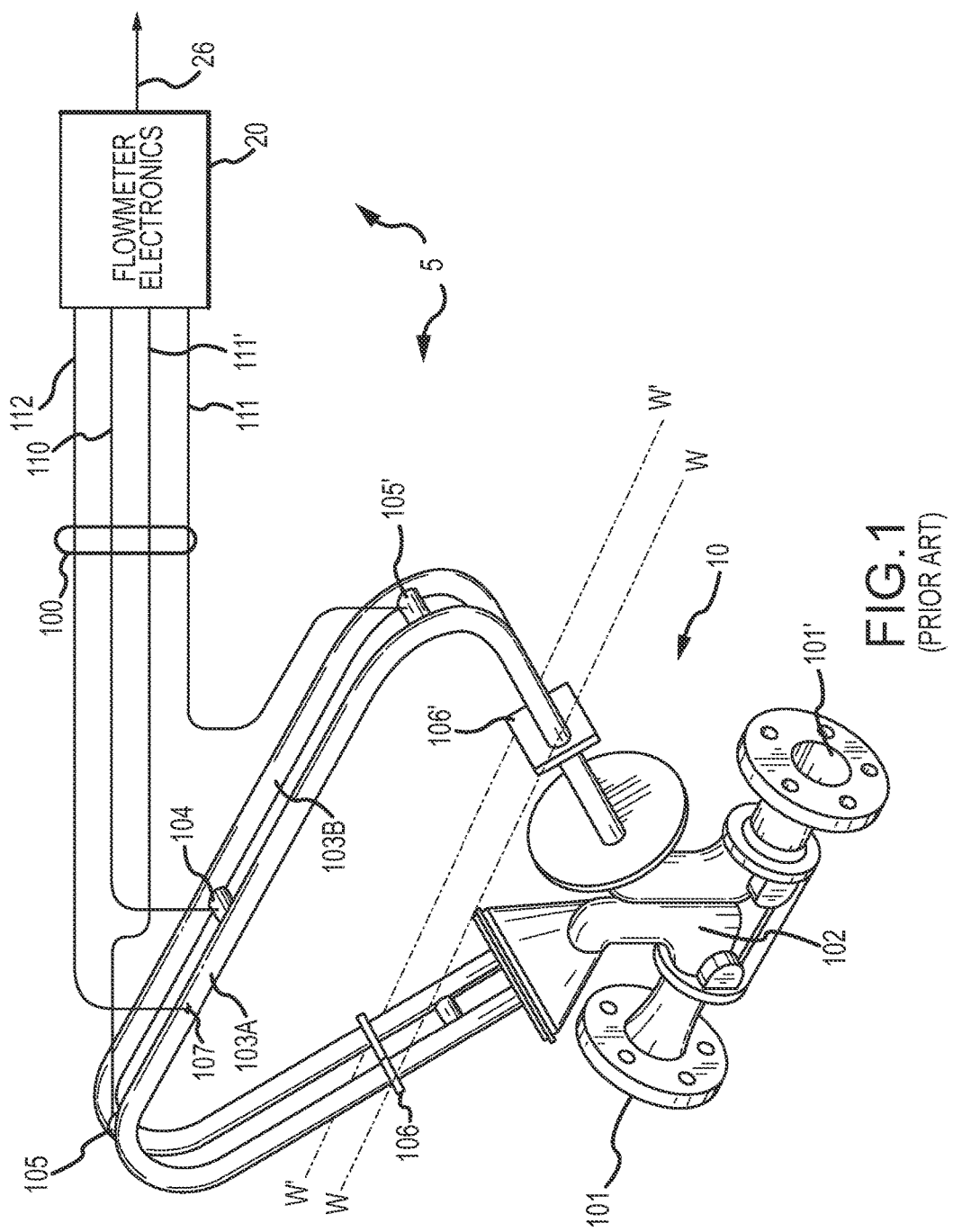
FIG. 1 illustrates a Coriolis flow meter in the prior art.

FIG. 1 illustrates a Coriolis flow meter 5 in the prior art. By way of example, and not limitation, it is expressly envisioned that embodiments of the present invention can be vibrating conduit sensors, including Coriolis mass flowmeters and vibrating densitometers. As an example embodiment, Coriolis flow meter 5 comprises a Coriolis flow meter sensor assembly 10 and meter electronics 20. Meter electronics 20 is connected to the sensor assembly 10 via path 100 to provide for mass flow rate, density, volume flow rate, totalized mass flow information, and other information over path 26. Path 26 represents multiple output ports carrying information on multiple channels of communications according to known flow meter designs (not shown in FIG. 1).

Flow meter sensor assembly 10 includes a pair of flanges 101 and 101', manifold 102, and flow tubes 103A and 103B. Connected to flow tubes 103A and 103B are driver 104 and pick-off sensors 105 and 105', and temperature sensor 107. Brace bars 106 and 106' serve to define the axis W and W' about which each flow tube 103A and 103B oscillates.

When flow meter sensor assembly 10 is inserted into a pipeline system (not shown in FIG. 1) which carries a material that is being measured, the material enters flow meter sensor assembly 10 through flange 101, passes through manifold 102 where the material is directed to enter flow tubes 103A and 103B, flows through flow tubes 103A and 103B and back into manifold 102 from where it exits flow meter sensor assembly 10 through flange 101'. Flow tubes 103A and 103B are selected and appropriately mounted to the manifold 102 to have substantially the same mass distribution, moments of inertia, and elastic modules about bending axes W-W and W'-W', respectively. The flow tubes 103A, 103B extend outwardly from manifold 102 in an essentially parallel fashion. Flow tubes 103A, 103B are driven by driver 104 in opposite directions about their respective bending axes W and W' at what is termed the first out of phase bending mode of the flow meter. Driver 104 may comprise any one of many well-known arrangements, such as a magnet mounted to flow tube 103A and an opposing coil mounted to flow tube 103B and through which an alternating current is passed for vibrating both flow tubes. A suitable drive signal is applied by meter electronics 20, via lead 110, to driver 104.

Pick-off sensors 105 and 105' are affixed to at least one of flow tubes 103A and 103B on opposing ends of the flow tube to measure oscillation of the flow tubes. As flow tubes 103A, 103B vibrate, pick-off sensors 105, 105' generate a first pick-off signal and a second pick-off signal. The first and second pick-off signals are applied to leads 111 and 111'.

Temperature sensor 107 is affixed to at least one of flow tubes 103A and 103B. Temperature sensor 107 measures the temperature of the flow tube in order to modify equations for the temperature of the system. Path 112 carries temperature signals from temperature sensor 107 to meter electronics 20.

Meter electronics 20 receives first and second pick-off signals appearing on leads 111 and 111', respectively. Flow meter electronics 20 processes the first and second pick-off signals to compute the mass flow rate, the density, or other property of the material passing through flow meter sensor assembly 10. This computed information is applied by meter electronics 20 over path 26 to a utilization means (not shown in FIG. 1). In example embodiments, flow meter electronics 20 includes an example microcontroller (as shown in FIG. 2) in order to generate a frequency output.

Figure 2:
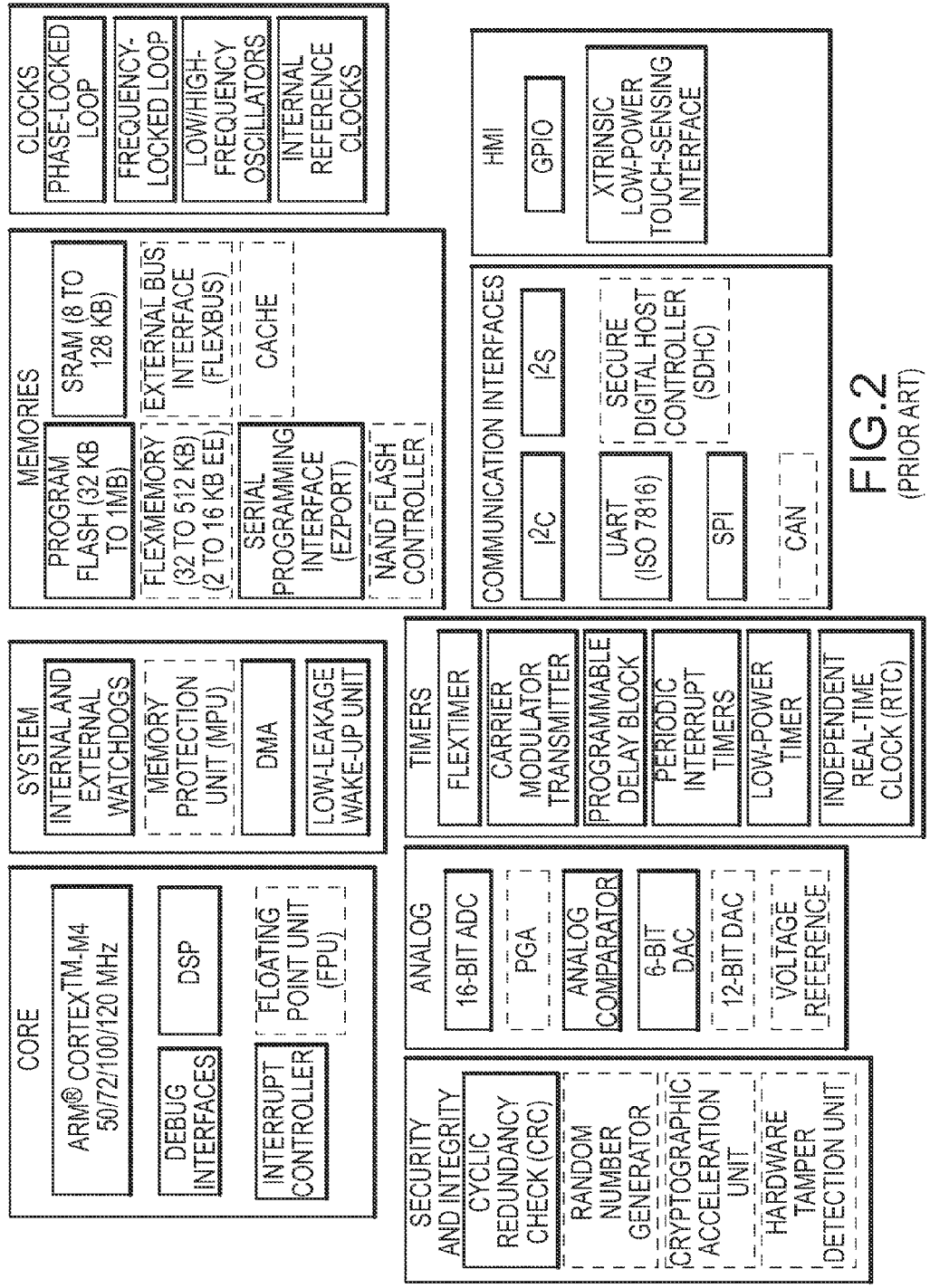
FIG. 2 illustrates a block diagram of a microcontroller in the prior art.

FIG. 2 illustrates a block diagram of an example microcontroller in the prior art. In an embodiment, the example microcontroller includes a core and various peripherals. In embodiments, the core is the section of the microcontroller where computations occur. In embodiments, the peripherals may include components for systems, various memories, clocks, security and integrity, analog, timers, communication interfaces, and a human machine interface (HMI) (also known as man machine interface (MMI)). As part of an example microcontroller, peripherals that can be used to create a frequency output include: a timer/counter, general-purpose-input-output pins (GPIO), and a variety of serial streaming interfaces such as UARTS, SPORTS, I2C, SPI, and I2S. According to aspects of the present invention, frequency outputs may physically appear on a GPIO or on one of the serial based communications interfaces (e.g. I2C, i2S, or SPI).

Figure 3:
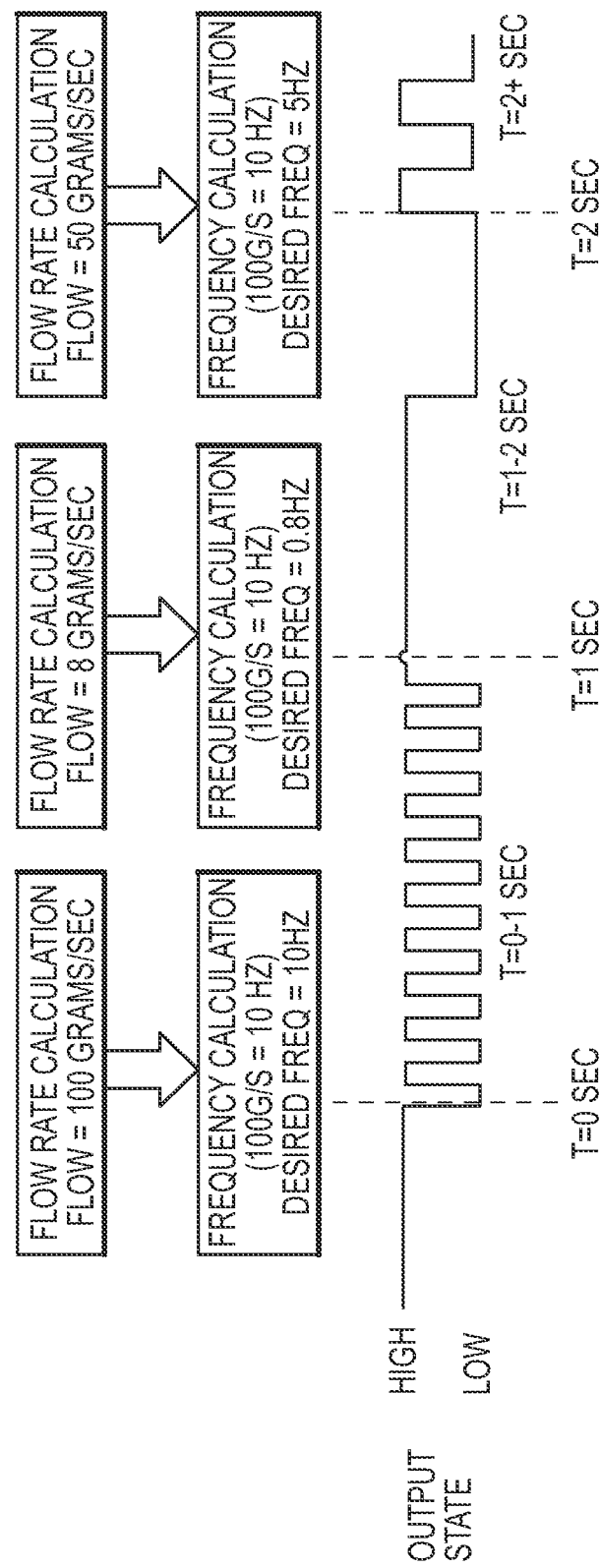
FIG. 3 illustrates an example frequency output according to an embodiment of the invention.

In FIG. 3, an example embodiment of the frequency output according to the present invention is shown. In operation, a parameter such as flow rate is calculated by known methods periodically at 1 Hz, in this example. Since T (sec)=1/f (Hz), known computations may be used to determine a parameter such as flow rate for time periods (T)=0-1, 1-2, and 2-3 seconds.

In calculating the desired output frequency, the user selectable flow rate calculation rate (m) is used (as described in below paragraphs). In the example of FIG. 3, for the first period (T=0-1 sec), the user selects the flow rate calculation rate (m) to be 100 grams/sec. Each time a flow rate is determined, a desired frequency corresponding to that flow rate is also determined, and that frequency will be output until the next period flow rate determination. In the example of the first period, the desired frequency of 10 Hz is determined based on the calculated flow rate (m) and a user-inputted predetermined flow rate-frequency scaling (x) or frequency per rate. For example, to obtain a desired frequency of 10 Hz with a known flow rate of 100 grams/sec, the user-inputted predetermined flow rate-frequency scaling (x) is 0.1.

As shown in FIG. 3, for the first period, the desired frequency of 10 Hz results in 10 whole pulses being output, where each pulse transition represents a toggled output state (for example, High to Low or Low to High).

For the second period, (T=1-2 sec), for example, using known computation methods, the flow rate is recalculated to be 8 grams/sec. In the example of the second period, the desired frequency of 0.8 Hz is determined based on the calculated flow rate (m) of 8 grams/sec and a user-inputted predetermined flow rate-frequency scaling ((x) also known as frequency per rate) of 0.1.

As shown in FIG. 3, for the second period, as the user requires the flow rate calculated at a frequency at 0.8 Hz, "0.8" whole pulses are output. In this example, only one pulse transition (corresponding to a toggled output state) has occurred and 1 whole pulse is still yet to be output. Accordingly, at T=2 sec, a fractional portion of the pulse is "left over" and must be taken into consideration in the third period (T=2-3 sec). In embodiments of the present invention, this situation is accounted for by fractional pulses periods (FP). As described in the algorithm and the table in below paragraphs, fractional pulses periods (FP) can be calculated based on the desired frequency (m*x), the initialized input clock period (p), and a preceding fractional pulse (FP); (FP=FP+(m*x*p)).

In further detail of FIG. 3, in the example embodiment, the initialized input clock period (p) is set at 20 Hz. At 20 instances per second, the following algorithm is run by an example microcontroller in the flow meter to determine and then set the desired output state of each input clock period (p).

The basic algorithm is defined by the following calculation:

(Input):        Current Flow rate = m  (e.g. 100 g/s)
(Constants):    Frequency per Rate = x (e.g. 10 Hz = 100 g/s, x = 0.1)
                 Input clock period = p  (e.g. 20 Hz, p = 0.05 S)
(State Variables): Current Output State
                 Fractional Pulses
<for each input clock period>
Fractional Pulses = Fractional Pulses + (m*x*p)
If (Fractional Pulses >= 0.5) {

-continued

```
    Fractional Pulses = Fractional Pulses − 0.5;
    Toggle Output State
}
```

The following table is an input clock period by input clock period example showing the calculations and output of the algorithm when applied to FIG. 3.

| Time | Flow Rate | Desired Freq. | m * x * p | Frac Pulses | Output State |
|---|---|---|---|---|---|
| 0.00 s | 100 g/s | 10 Hz | 0.5 | 0 + 0.5 ≥ 0 | Low |
| 0.05 s | | | | 0 + 0.5 ≥ 0 | High |
| 0.10 s | | | | 0 + 0.5 ≥ 0 | Low |
| 0.15 s | | | | 0 + 0.5 ≥ 0 | High |
| 0.95 s | | | | 0 + 0.5 ≥ 0 | High |
| 1.00 s | 8 g/s | 0.8 Hz | 0.04 | 0 + 0.04 ≥ .04 | High |
| 1.05 s | | | | .04 + .04 ≥ .08 | High |
| 1.10 s | | | | .08 + .04 ≥ .12 | High |
| 1.15 s | | | | .12 + .04 ≥ .16 | High |
| 1.55 s | | | | .44 + .04 ≥ .48 | High |
| 1.60 s | | | | .48 + .04 ≥ .02 | Low |
| 1.65 s | | | | .02 + .04 ≥ .06 | Low |
| 1.95 s | | | | .26 + .04 ≥ .30 | Low |
| 2.00 s | 50 g/s | 5 Hz | 0.25 | .30 + .25 ≥ .05 | High |
| 2.05 s | | | | .05 + .25 ≥ .30 | High |
| 2.10 s | | | | .30 + .25 ≥ .05 | Low |
| 2.15 s | | | | .05 + .25 ≥ .30 | Low |
| 2.20 s | | | | .30 + .25 ≥ .05 | High |

As an example of a fractional pulse (FP), the "remainder" of the 0.8 Hz that was not put out in the second period (T=1-2 sec) is kept track of in the third period (T=2-3 sec) via the "0.30" value in the accumulator. Used as an initial value in the (T=2-3 sec), "0.30" is the amount left over at 1.95 seconds.

Also, as shown in the above table and FIG. 3, the time between transitions (where the output state remains either low or high) is the period of the desired output frequency.

By utilizing the period of the desired output frequency, a flow meter can measure an instantaneous flow rate. For instance, for an example output period, using the equation: T (sec)=1/f (Hz) and the frequency per rate (x), the instantaneous flow rate can be determined by the following equation: instantaneous flow rate (g/s)=desired frequency (Hz)/frequency per rate (x).

Moreover, the total integrated flow rate may also be determined by counting the number of toggled output states and taking into account the frequency per rate (x). For example, in FIG. 3, in the first period (T=0-1 sec), 10 toggled output states multiplied by the frequency per rate (x) of 0.1=100 grams/sec of total integrated flow.

In contrast to the above example of FIG. 3 where 10 Hz represents 100 grams/second, in another embodiment, for example, 100 Hz may represent 100 grams/second. In this new example, each whole pulse would now represent 1 gram. Accordingly, the present invention is not intended to be limited to any specific characterization of the frequency per rate (x).

Likewise, the invention is also not limited to a characterization of the frequency of the input clock period (p). As an example, and as mentioned in above paragraphs, the present invention provides an accurate representation of jitter in a given input clock period (p). The present invention may utilize the following equation to determine the percentage of maximum jitter:

Max Jitter (%)=Max Output Frequency (Hz)/Input Clock Frequency (Hz)

Using the above equation, if a frequency output of 0 to 10 kHz with a jitter of less than 0.1% is desired, an input clock (p) of 10 MHz would be required.

Figure 4:
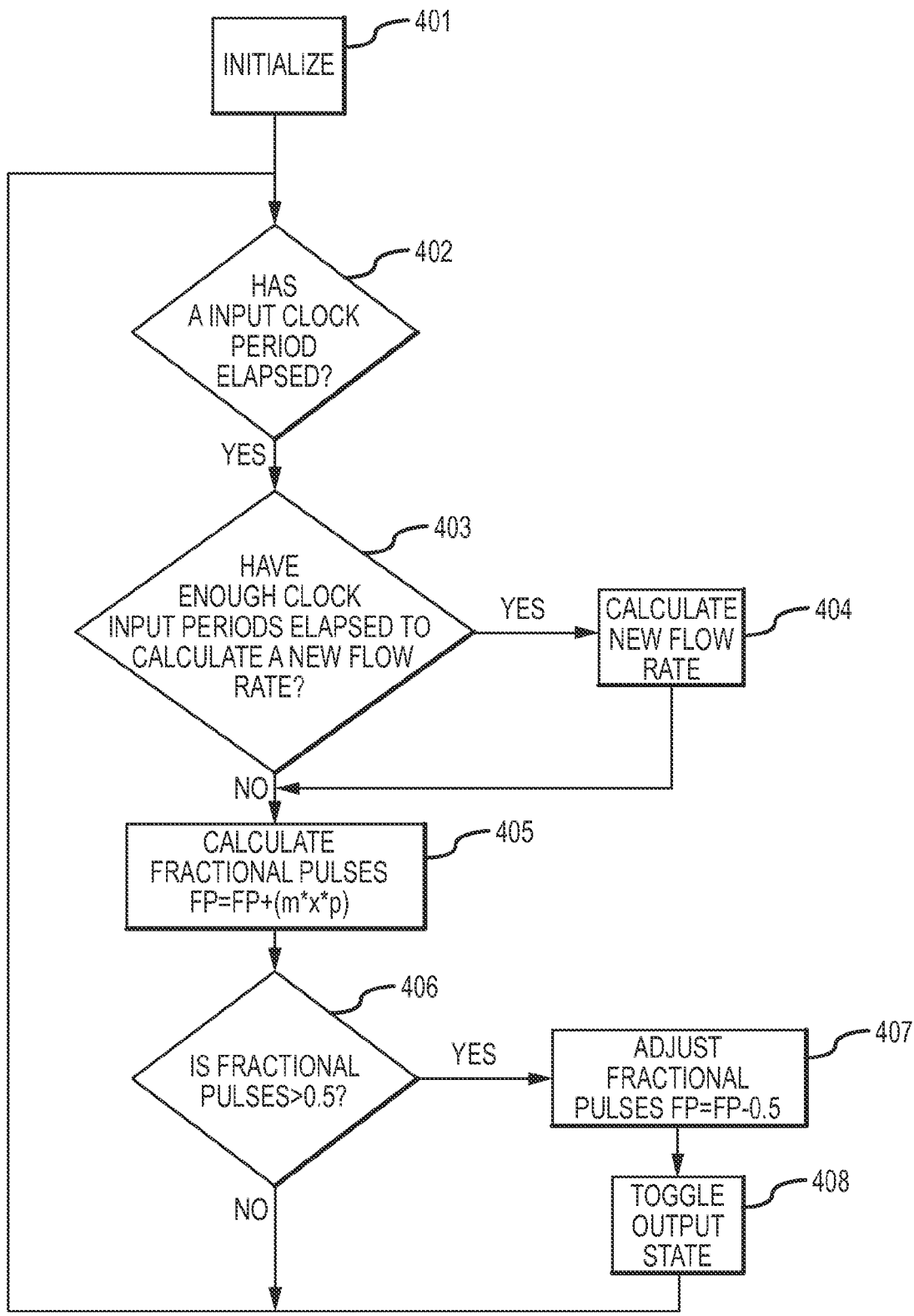
FIG. 4 illustrates a flow chart according to an embodiment of the invention.

In FIG. 4, a flow diagram according to an embodiment of the present invention is provided. In Step 401, an input clock signal having a predetermined period of a plurality of periods is initialized. Next in Step 402, a determination is made whether an input clock period has elapsed. In doing so, the input clock is established as a predetermined, fixed frequency. For example, if the input clock is 1 MHz, each period of the input clock would be 1 μS. Accordingly, the input clock is a user selectable part of the design, and is therefore, predetermined. In certain embodiments of the present invention, the input clock is the fastest clock in the flow meter. If in operation the input clock was not the fastest clock, then a variety of methods may be used to determine when the input clock elapses, such as polling, or a software interrupt.

If the input clock period has elapsed, in Step 403, a determination is made whether enough clock input periods have elapsed such that a new flow rate may be calculated. This is related to the "user selectable flow rate calculation rate (m)". For example, if the input clock is 10,000 Hz, and the user wants the flow rate calculated at 10 Hz, then there would be (10,000 Hz/10 Hz=00) 100 input clocks elapsed per flow rate calculation.

If Step 403 is determined to be "YES", in Step 404, a new flow rate is calculated. By calculating a new flow rate, a desired frequency (m*x) may be calculated based on the calculated flow rate (m) and a user-inputted predetermined flow rate-frequency scaling (x). If Step 403 is determined to be "NO", in Step 405, fractional pulses periods (FP) are calculated based on the desired frequency (m*x), the initialized input clock period, and a preceding fractional pulse (FP); (FP=FP+m*x*p)). If, however, the preceding fractional pulse is an initial fractional pulse, the preceding fractional pulse may be set to zero.

In Step 406, a determination is made whether fractional pulses periods are greater than or equal to half of an output pulse period or 0.5, where the output pulse period is determined in relation to the frequency (p=1/f). As such, the fractional pulses period corresponds to a duration that the output period has elapsed. If the fractional pulses are not greater than or equal to 0.5, the resultant pulse period is input to Step 402.

If fractional pulses in Step 406 are greater than or equal to 0.5, in Step 407, the fractional pulses are adjusted by the following equation, FP=FP−0.5. The fractional pulse now represents the remainder value and triggers a switching of the output state.

In Step 408, the desired frequency is now provided for a particular flow rate by toggling the output state when the fractional pulses periods are greater than or equal to half of an output pulse period. The operation then continues in a loop as the resultant fractional pulse is input to Step 402.

In example embodiments, the serial output hardware commonly "on-board" the microcontroller may be used to lighten the processing load. This type of hardware includes but is not limited to I2S, SPI, USARTS/ARTS, "SPORTS", and even some JTAG ports. Further, DMA can also be used to lighten the processing load.

To incorporate the various types of serial output hardware, (e.g. SPI, DMA, etc), "blocks" of output states would be pre-calculated and then given to the hardware to be output at the "input clock rate". This is advantageous in that it reduces bandwidth requirements by reducing the overhead of each output calculation. For example, with SPI, a block of 8, 16 or 32 output states could be pre-calculated and then 'automatically' output by the standard SPI hardware. DMA could be used to further increase the block size to any desired size.

Advantageously, the present invention may easily be enhanced to incorporate any of the "other aspects" (Quadrature, pulse width, etc.).

Advantageously, the present invention may be completely scalable over any desired frequency output range, limited only by the resolution of the specific data types chosen to implement the computations and the input clock frequency. In embodiments, standard data types include integers (e.g. 8, 16, 32, or 64 bit) or floating point (typically IEEE534 single or double precision).

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

The invention claimed is:

1. A method to generate a frequency output on a microcontroller comprising:
   initializing an input clock signal having a predetermined period;
   calculating a parameter based on the predetermined period;
   calculating a desired frequency based on the parameter and a predetermined flow rate-frequency scaling;
   calculating a plurality of fractional pulses, wherein
      each fractional pulse of the plurality of fractional pulses is calculated based on the desired frequency, the predetermined period of the input clock signal, and a value of a preceding fractional pulse, and
   outputting the desired frequency by toggling an output state when the calculated fractional pulse is greater than or equal to half of an output pulse period.

2. The method of claim 1, wherein if the preceding fractional pulse is an initial fractional pulse, the value of the preceding fractional pulse is set to zero.

3. The method of claim 1, wherein the output pulse period is calculated based on the predetermined period of the input clock signal, the calculated parameter, and the predetermined flow rate-frequency scaling.

4. The method of claim 1, wherein the meter electronics are configured to measure an instantaneous flow rate.

5. The method of claim 1, wherein the meter electronics are configured to measure a total integrated flow based on the number of toggled output states and the predetermined flow rate-frequency scaling.

6. The method of claim 1, wherein the parameter includes a flow rate.

7. A vibratory flow meter (5) comprising:
   a flow meter sensor assembly (10) including one or more flow tubes (103A, 103B) and first and second pickoff sensors (105, 105');
   a driver (104) configured to vibrate the one or more flow tubes (103A, 103B); and
   meter electronics (20) coupled to the first and second pickoff sensors (105,105') and coupled to the driver (104), with the meter electronics (20) generating a frequency output by being configured to:
      initialize an input clock signal having a predetermined period;
      calculate a parameter based on the predetermined period;
      calculate a desired frequency based on the calculated parameter and a predetermined flow rate-frequency scaling;
      calculate a plurality of fractional pulses, wherein
         each fractional pulse of the plurality of fractional pulses is calculated based on the desired frequency, the predetermined period of the input clock signal, and a value of a preceding fractional pulse, and
      output the desired frequency by toggling the output state when the calculated fractional pulse is greater than or equal to half of an output pulse period.

8. The device of claim 7, wherein if the preceding fractional pulse is an initial fractional pulse, the value of the preceding fractional pulse is set to zero.

9. The device of claim 7, wherein the output pulse period is calculated based on the predetermined period of the input clock signal, the calculated parameter, and the predetermined flow rate-frequency scaling.

10. The device of claim 7, wherein the meter electronics are configured to measure an instantaneous flow rate.

11. The device of claim 7, wherein the meter electronics are configured to measure a total integrated flow based on the number of toggled output states and the predetermined flow rate-frequency scaling.

12. The device of claim 7, wherein the parameter includes a flow rate.

* * * * *